United States Patent
Furuse

(10) Patent No.: US 6,390,533 B1
(45) Date of Patent: May 21, 2002

(54) SYNTHETIC RESIN VEHICLE DOOR OUTER PANEL

(75) Inventor: Yoshinobu Furuse, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/385,044

(22) Filed: Aug. 30, 1999

(30) Foreign Application Priority Data

Aug. 31, 1998 (JP) .......................................... 10-245313
Aug. 31, 1998 (JP) .......................................... 10-245314
Aug. 31, 1998 (JP) .......................................... 10-245315

(51) Int. Cl.[7] ................. B60J 5/04; B60J 5/00
(52) U.S. Cl. ................. 296/146.5; 296/146.6; 296/188
(58) Field of Search .................. 296/146.5, 146.6, 296/209, 188, 901; 49/502

(56) References Cited

U.S. PATENT DOCUMENTS

| | | | | |
|---|---|---|---|---|
| 4,307,911 A | * | 12/1981 | Pavlik | 296/188 |
| 4,606,149 A | * | 8/1986 | Hamada et al. | 49/502 |
| 4,651,470 A | * | 3/1987 | Imura et al. | 296/146.6 |
| 4,704,822 A | * | 11/1987 | Srock et al. | 49/502 |
| 4,796,946 A | * | 1/1989 | Wilson et al. | 296/188 |
| 4,866,883 A | * | 9/1989 | Brown et al. | 296/146.5 |
| 4,915,442 A | * | 4/1990 | Garnweidner | 296/146.6 |
| 4,923,542 A | * | 5/1990 | Janicki et al. | 49/502 |
| 4,945,682 A | * | 8/1990 | Altman et al. | 296/146.5 |
| 5,531,499 A | * | 7/1996 | Vecchio et al. | 296/146.7 |
| 5,573,297 A | * | 11/1996 | DeRees et al. | 296/146.6 |
| 5,573,298 A | * | 11/1996 | Walker et al. | 296/188 |
| 5,702,148 A | * | 12/1997 | Vaushan et al. | 49/502 |
| 5,749,176 A | * | 5/1998 | Heim et al. | 49/502 |
| 5,795,013 A | * | 8/1998 | Keller et al. | 296/188 |
| 5,822,927 A | * | 10/1998 | Hellenkamp et al. | 49/502 |
| 5,855,094 A | * | 1/1999 | Baudisch et al. | 49/502 |
| 5,865,496 A | * | 2/1999 | Odan et al. | 296/146.6 |
| 5,904,002 A | * | 5/1999 | Emerling et al. | 49/502 |
| 5,927,020 A | * | 7/1999 | Kobrehel | 49/502 |

FOREIGN PATENT DOCUMENTS

| | | | | |
|---|---|---|---|---|
| DE | 3608506 A1 | * | 11/1987 | 49/502 |
| DE | 3934590 A1 | * | 4/1991 | 49/502 |
| JP | 56-50813 | * | 5/1981 | 296/188 |
| JP | 63-215419 | * | 9/1988 | 296/188 |
| JP | 2-41986 | * | 2/1990 | 296/901 |
| JP | 3-45421 | * | 2/1991 | 296/146.6 |
| JP | 4-278825 | * | 10/1992 | 296/146.6 |
| JP | 5-229453 | * | 3/1993 | 296/188 |
| JP | 5-286364 | * | 11/1993 | 296/146.6 |
| JP | 5-319092 | * | 12/1993 | 296/146.6 |
| JP | 6-80022 | * | 3/1994 | 296/146.5 |
| JP | 6-171362 | * | 6/1994 | 296/146.6 |

* cited by examiner

Primary Examiner—Stephen T. Gordon
Assistant Examiner—Hilary Gutman
(74) Attorney, Agent, or Firm—Morgan, Lewis & Bockius LLP

(57) ABSTRACT

A vehicle door outer panel formed through a gas assist injection molding method has a panel main body and an elongated hollow reinforcement projection on an inner surface of the panel main body and extending in a longitudinal direction of a vehicle body so as to oppose a side sill of a vehicle body frame. Accordingly, it is possible to absorb a collision load from a side of a vehicle body by allowing the collision load to be transmitted to the vehicle body frame.

8 Claims, 9 Drawing Sheets

SYNTHETIC RESIN VEHICLE DOOR OUTER PANEL

BACKGROUND OF THE INVENTION

The present invention relates to a synthetic resin vehicle door outer panel. In addition, the present invention relates to a mounting structure for a synthetic resin vehicle door outer panel, and more particularly to an improvement to a mounting structure in which a synthetic resin door outer panel is secured to a door frame with a plurality of bolts and nuts. Further, the present invention relates to a vehicle door, and more particularly to a vehicle door comprising a synthetic resin door outer panel, and a door frame disposed on an inner surface side of the door outer panel for holding the door outer panel. The door frame has, at a vertically intermediate portion thereof, a frame constituent member extending straight in longitudinal direction of a vehicle body for reinforcing the door outer panel.

A conventional door outer panel is known that has a panel main body and a plurality of reinforcement ribs on an inner surface of the panel main body.

When a collision load is applied to the vehicle body of an automobile from the side, in order to absorb the collision load efficiently, the collision load needs to be transmitted from a door outer panel to the rest of the vehicle body frame via a side sill. With a conventional door outer panel, however, since the rigidity at a lower edge portion of the door outer panel is low, such a collision load absorption mechanism cannot easily occur. This problem affects conventional door outer panels.

In addition, a conventional mounting structure of this type has a door outer panel positioned relative to a door frame, and is then secured thereto at a plurality of securing positions or portions, each using a bolt and a nut for securing the door outer panel to the door frame.

With the conventional art, however, a substantial number of man-hours is required for mounting a door outer panel to a door frame. This increases the production cost of a vehicle, and is a problem of conventional mounting structures.

Further, the conventional door outer panel is constructed so as to have a predetermined thickness in order to have a certain surface rigidity. However, since thickening the panel is often insufficient to provide such a surface rigidity at a vertically intermediate portion, a frame constituent member as described above is disposed on the inner surface side of the door outer panel for reinforcing the vertically intermediate portion.

In this case, when the vertically intermediate portion of the door outer panel, in other words, a portion of the door outer panel opposed to the frame constituent member, is formed into an arch-like portion, which is slightly expanded sideways of the vehicle body from a design requirement, a gap is generated between the door outer panel and the frame constituent member. Moreover, the gap becomes poorly defined in the longitudinal direction of the vehicle body.

To cope with this, conventionally, to reinforce the relevant portion of the door outer panel with the frame constituent member substantially uniformly with respect to the longitudinal direction of the vehicle body, several kinds of rubber members, each having a different thickness, are installed in the gap. Alternatively, a plurality of rubber members having the same thickness are mounted in the gap using the elasticity thereof.

With the conventional approach, however, since substantial time is needed for production and installation of various types of rubber members, the production cost of conventional vehicle doors is increased.

SUMMARY OF THE INVENTION

An object of one aspect of the present invention is to provide a door outer panel that establishes a collision load absorption mechanism by improving the rigidity of a lower edge portion of the door outer panel.

In order to attain the above aspect, there is provided a synthetic resin vehicle door outer panel, formed through a gas assist injection molding method, that has a panel main body and an elongated hollow reinforcement projection provided on an inner surface of the panel main body, and extending in a longitudinal direction along the vehicle body so as to be opposed to a side sill on a vehicle body frame.

According to this construction, the rigidity at a lower edge portion of the door outer panel is increased by the elongated hollow reinforcement projection. Moreover since the elongated hollow projection opposes the side sill, even when a collision load is applied to the lower edge of the door outer panel from the side of the vehicle body, the collision load can be absorbed efficiently by allowing the applied collision load to be transmitted from the door outer panel to the rest of a vehicle body frame via the side sill. When using the gas assist injection molding, an elongated hollow projection can easily be molded as part of the molding process of a panel main body.

In this case, the collision load absorption mechanism can be established easily and securely through a construction in which a mounting portion is provided on the elongated hollow projection, so that the elongated hollow projection is mounted on a door frame at a portion close to the side sill.

In addition, when the door frame does not extend as far as a corner portion of the panel main body for weight reduction and economy, a continuous hollow reinforcement raised portion is provided on an inner surface of the panel main body at a corner area thereof, protruding from an associated corner portion of the door frame and a mounting area which is opposed to the corner portion of the door frame for mounting thereonto so as to extend over those two areas.

With this construction, the corner and mounting areas of the panel main body can be reinforced, whereby flutter of the corner portions can be prevented. The hollow raised portions can easily be molded as part of a molding process of a panel main body when the gas assist injection molding process is used.

Furthermore, in order to enhance the surface torsional rigidity of the door outer panel, a hollow raised portion is disposed on the inner surface of the panel main body at a lower portion on a rear end side thereof, so as to communicate with the elongated hollow projection, and a reinforcement rib continuous with the elongated hollow projection is disposed on the inner surface of the panel main body along a side edge portion on a front end side thereof. A reinforcement rib continuous with the hollow raised portion is disposed on the inner surface of the panel main body along a side edge portion on the rear end side thereof. In addition, a reinforcement rib formed closer to the upper ends of the respective two reinforcement ribs at a rear end thereof is disposed on the inner surface of the panel main body along an upper edge portion thereof.

Another object is to provide a mounting structure of the aforementioned type which can manage to facilitate the positioning of a synthetic resin door outer panel relative to a door frame and reduce man-hours required for mounting the door outer panel to the door frame.

There is provided a vehicle door outer panel mounting structure in which a synthetic resin door outer panel is fixed mounted on a door frame with a plurality of bolts and nuts. The mounting structure includes a structure for suspending a panel and at least one structure for fixing the panel in an easy and simplified fashion. Both are constructed prior to fixed mounting the door outer panel with the bolts and nuts. The structure for suspending a panel comprises a hook portion provided integrally with an upper portion on an inner surface of the door outer panel and an engagement portion provided on the door frame for engagement with the hook portion. The structure for fixing the panel in an easy and simplified fashion comprises a press insertion type fixing piece provided on one of the inner surface of the door outer panel and the door frame, and an engagement hole for the press-insertion type fixing piece provided on the other.

With this structure, the positioning of the door outer panel relative to the door frame can be facilitated through the suspension of the door outer panel relative to the door frame and press insertion of the fixing piece. Since the door outer panel is fixed mounted onto the door frame with bolts and nuts, good workability in mounting can be provided. In addition, since the fixing structure using the fixing piece also contributes to mounting the door outer panel onto the door frame, the number of fixing positions using bolts and nuts can be reduced based on the extent of contribution of the structure, allowing for a reduction of man-hours required for mounting the door outer panel to the door frame.

Furthermore, since the door outer panel is formed of a synthetic resin, the hook portion can easily be formed as part of a molding process of the door outer panel. In addition, one of a paired bolt and nut can be embedded in the door outer panel, which is considered as effective in improving the fixing efficiency using bolts and nuts.

Further, a vehicle door as described above can have parts, functioning similar to the conventional reinforcing rubber members described in the Background, by utilizing a molding process for forming the door outer panel and forming the parts from a synthetic resin thereof The reinforcing can be provided for by only allowing the door outer panel to be positioned and held relative to the door frame.

To this end, there is provided a vehicle door including a synthetic resin door outer panel and a door frame disposed on an inner surface side of the door outer panel for holding it, the door frame having at a vertically intermediate portion thereof a frame constituent member extending straight in a longitudinal direction of a vehicle body for reinforcing the door outer panel. The door outer panel has on an inner surface thereof a grid-like reinforcement portion formed integrally therewith. The grid-like reinforcement portion has a plurality of notches arranged in a longitudinal direction of the vehicle body so as to avoid any interference with the frame constituent member. A gap exists between a side of the frame constituent member that faces sideways of the vehicle body and inner surfaces of the respective notches that are opposed to the side of the frame constituent member. The gap is made uniform for all of the notches.

The grid-like reinforcement portion is molded integrally with the door outer panel molding process of the door outer panel. In addition, it is easy to use molding technology to make the gap uniform with respect to all of the notches. Therefore, a uniform reinforcement by the frame constituent member relative to the vertically intermediate portion of the door outer panel can occur with respect to the longitudinal direction of the vehicle body by only allowing the door outer panel to be positioned and held relative to the door frame.

On the other hand, since the grid-like reinforcement portion and the frame constituent member are spaced away from each other at all times, the generation of noise and wear can be avoided which would otherwise be the case when they slide or rub together.

DETAILED DESCRIPTION OF THE PREFERRED EMBODIMENT

Figure 1:
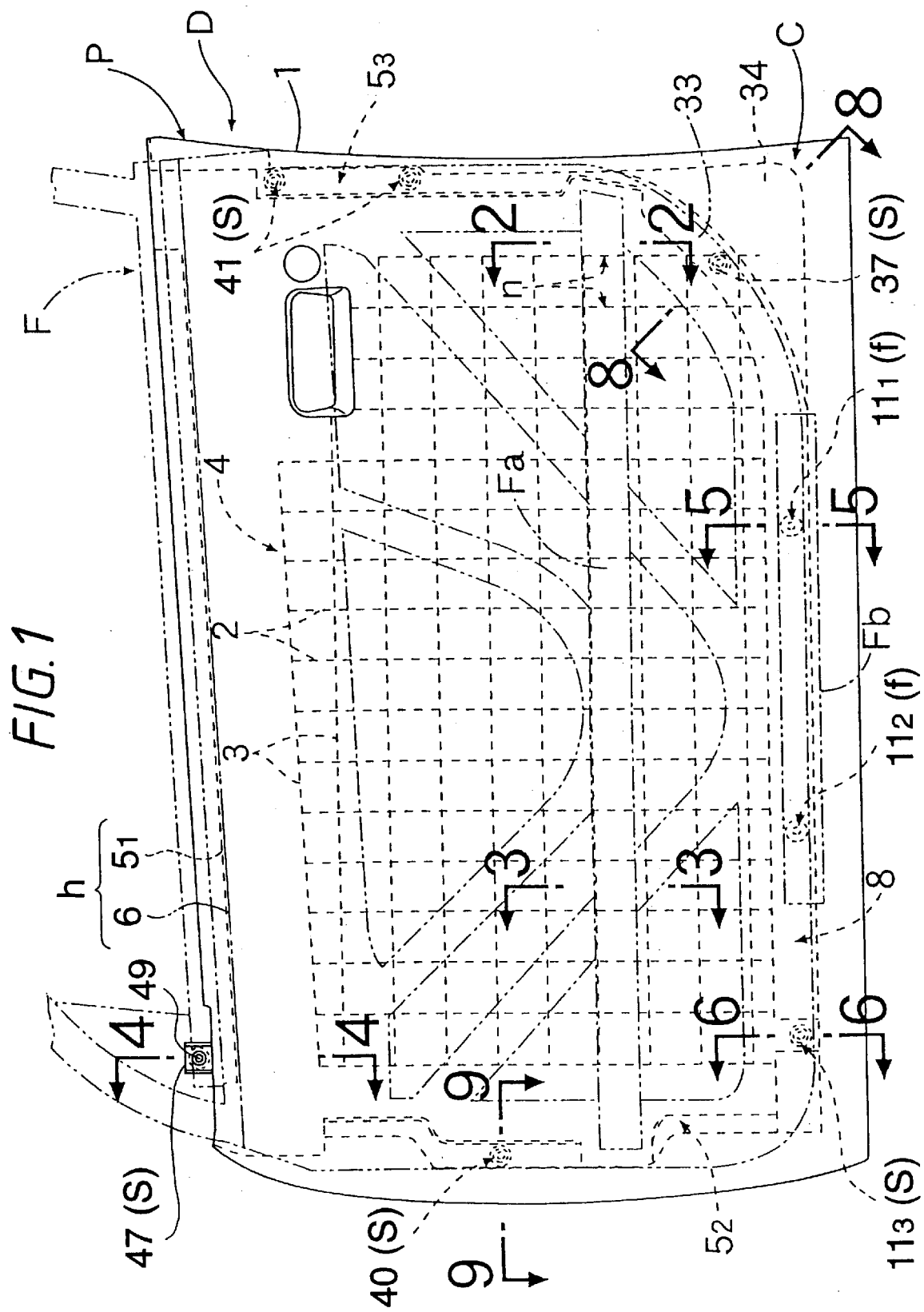
FIG. 1 shows a schematic side view of a vehicle door according to the present invention.

In a vehicle door D shown in FIG. 1, a vehicle door outer panel P is formed of a non-crystalline synthetic resin (e.g., ABS resin, polyamide 6, or the like) using a gas assist injection molding. A door frame F is disposed on an inner surface of the door outer panel for holding the door outer panel in such a manner as to be opposed to the panel P. The door frame F is formed of an aluminum alloy. The door frame F has, at a vertically intermediate portion thereof, a square pipe-like frame constituent member Fa extending straight in a longitudinal direction of a vehicle body for reinforcing the door outer panel.

The door outer panel P has a panel main body 1 of a substantially square shape. A grid-like reinforcement portion 4 comprising a plurality of vertical ribs 2 and a plurality of horizontal ribs 3 is formed at a main portion of an inner surface of the panel main body 1 (excluding peripheral portions thereof) integrally with the panel main body 1.

Figure 3:
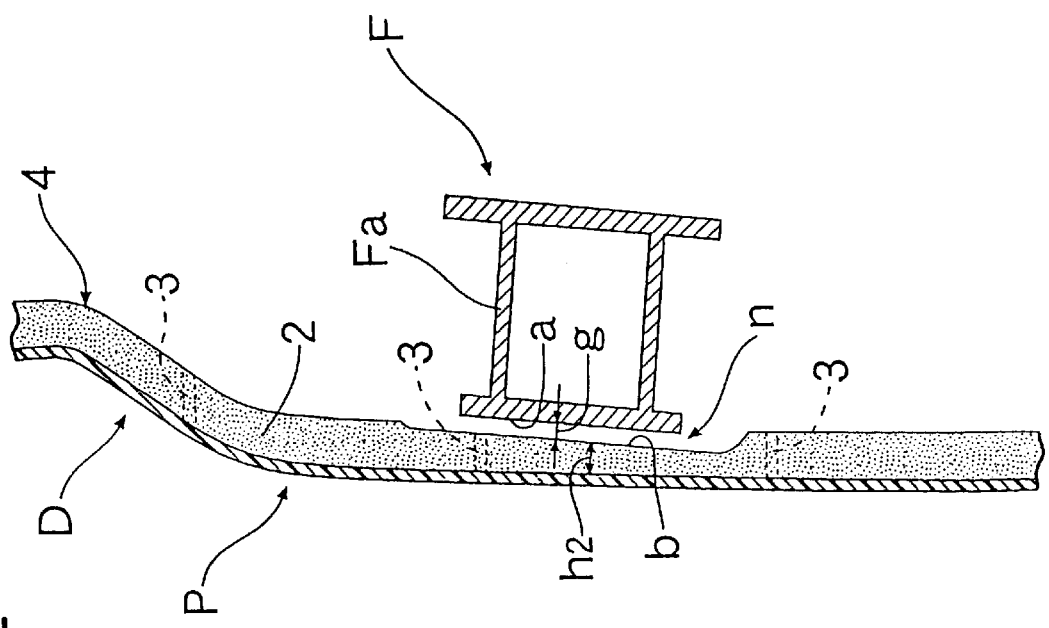
FIG. 3 shows a cross-sectional view taken along the line 3—3 of FIG. 1.
Figure 2:
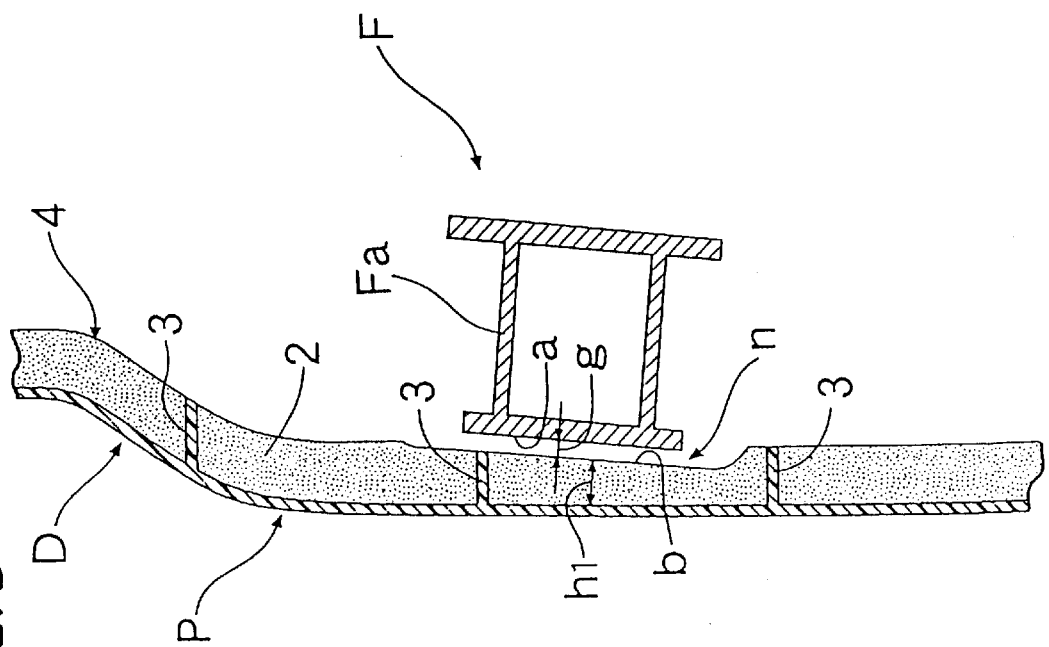
FIG. 2 shows a cross-sectional view taken along the line 2—2 of FIG. 1.

As shown in FIGS. 2 and 3, the grid-like reinforcement portion 4 has a plurality of notches (n) arranged in the longitudinal direction of the vehicle body so as to avoid any interference with the frame constituent member Fa. The notches (n) are formed in the vertical ribs 2, and the horizontal ribs 3 in those notches are made shorter when compared with the horizontal ribs 3 outside the notches (n).

In addition, a gap (g) between a side (a) of the frame constituent member Fa that faces a side of the vehicle body and inner surfaces (b) of the respective notches that are opposed to the side (a) of the frame constituent member Fa is set to be uniform for all of the notches (n). A front end side of the door outer panel P, shown in FIGS. 1 and 3, is slightly expanded sideways of the vehicle body relative to a rear end side of the door outer panel P. To make the gap (g) uniform, the height ($h_1$) of the vertical rib 2 at the front end side is set taller than the height ($h_2$) of the vertical rib 2 at the rear end side (i.e., $h_1 > h_2$).

The grid-like reinforcement portion 4 is, as described above, molded together with the door outer panel P as part of a molding process. In addition, molding technology can easily make the gap (g) uniform with respect to all of the notches (n).

Consequently, a uniform reinforcement by the frame constituent member Fa relative to the intermediate vertical portion of the door outer panel P can be achieved with respect to the longitudinal direction of the vehicle body by only by allowing the door outer panel P to be positioned and held relative to the door frame F.

On the other hand, since the grid-like reinforcement portion and the frame constituent member are spaced away from each other at all times, the generation of noise and wear can be avoided, unlike the case when they slide or rub against each other.

Figure 4:
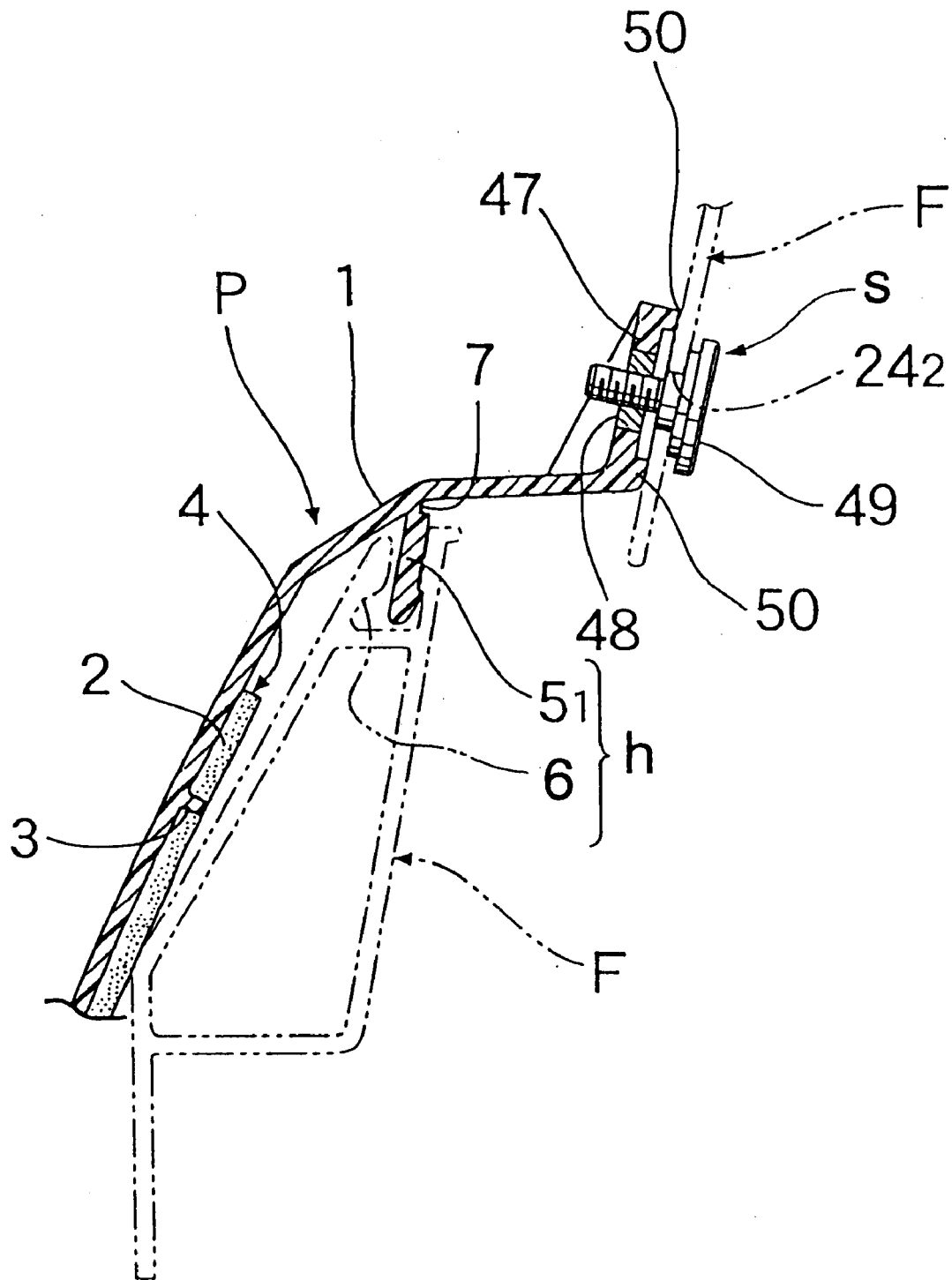
FIG. 4 shows a cross-sectional view taken along the line 4—4 of FIG. 1.

As shown in FIG. 4, a first reinforcement rib $5_1$ (functioning as a hook portion) which protrudes downwardly is formed at an upper curved portion on the inner surface of the panel main body 1 integrally with the panel main body 1 along an upper edge portion of the inner surface thereof. The first reinforcement rib $5_1$ fits in a holding groove 6 formed in the door frame F so as to open upwardly and extend in a longitudinal direction of a vehicle body, whereby the door outer panel P is suspended therefrom over the door frame F. Therefore, the first reinforcement rib $5_1$ and the holding groove 6 together form a panel suspending structure (h). A small elongated recess 7 is formed at a proximal end of the first reinforcement rib $5_1$ to prevent the generation of a sink mark at the time of molding.

Figure 5:
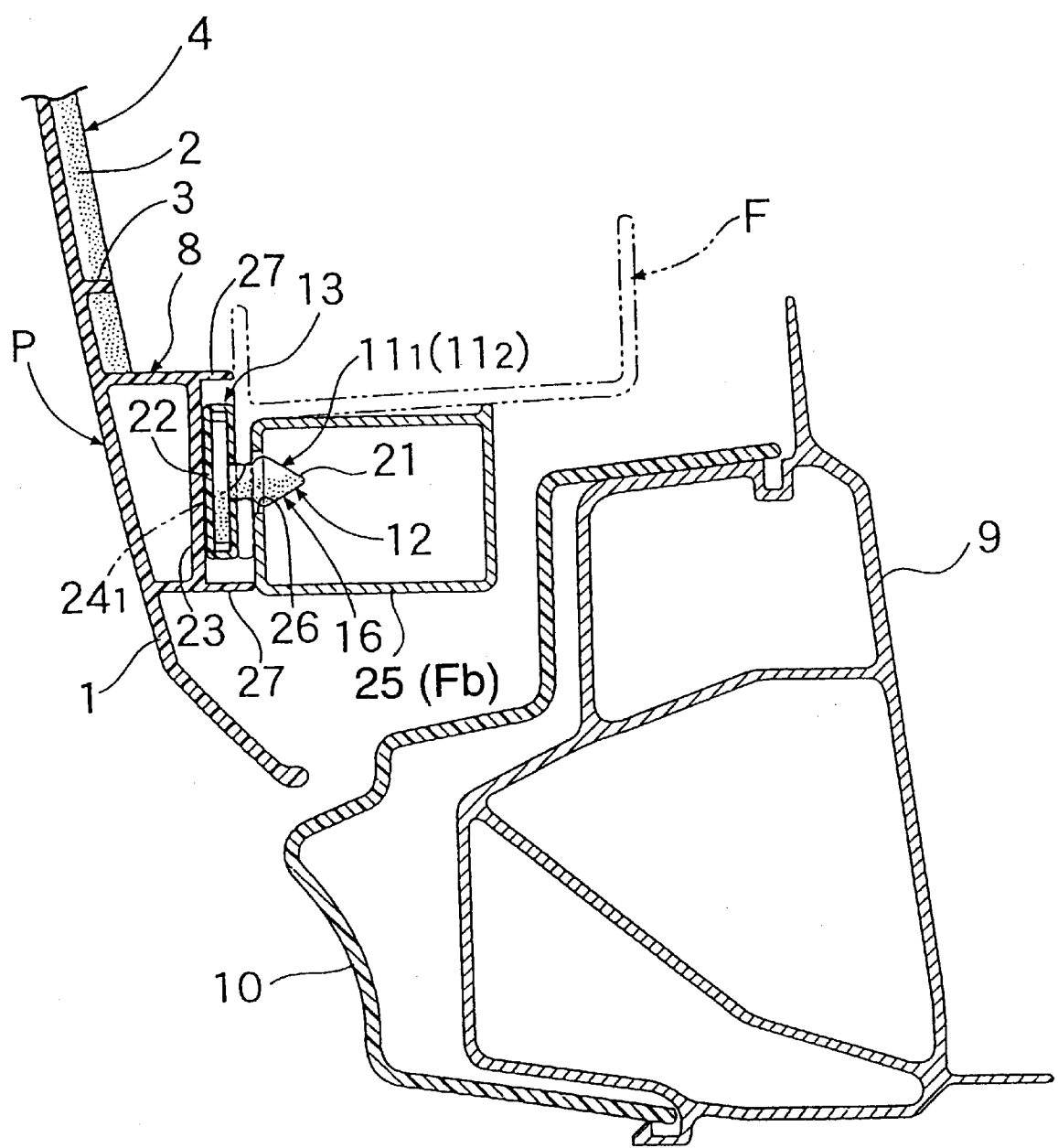
FIG. 5 shows a cross-sectional view taken along the line 5—5 of FIG. 1.
Figure 5A:
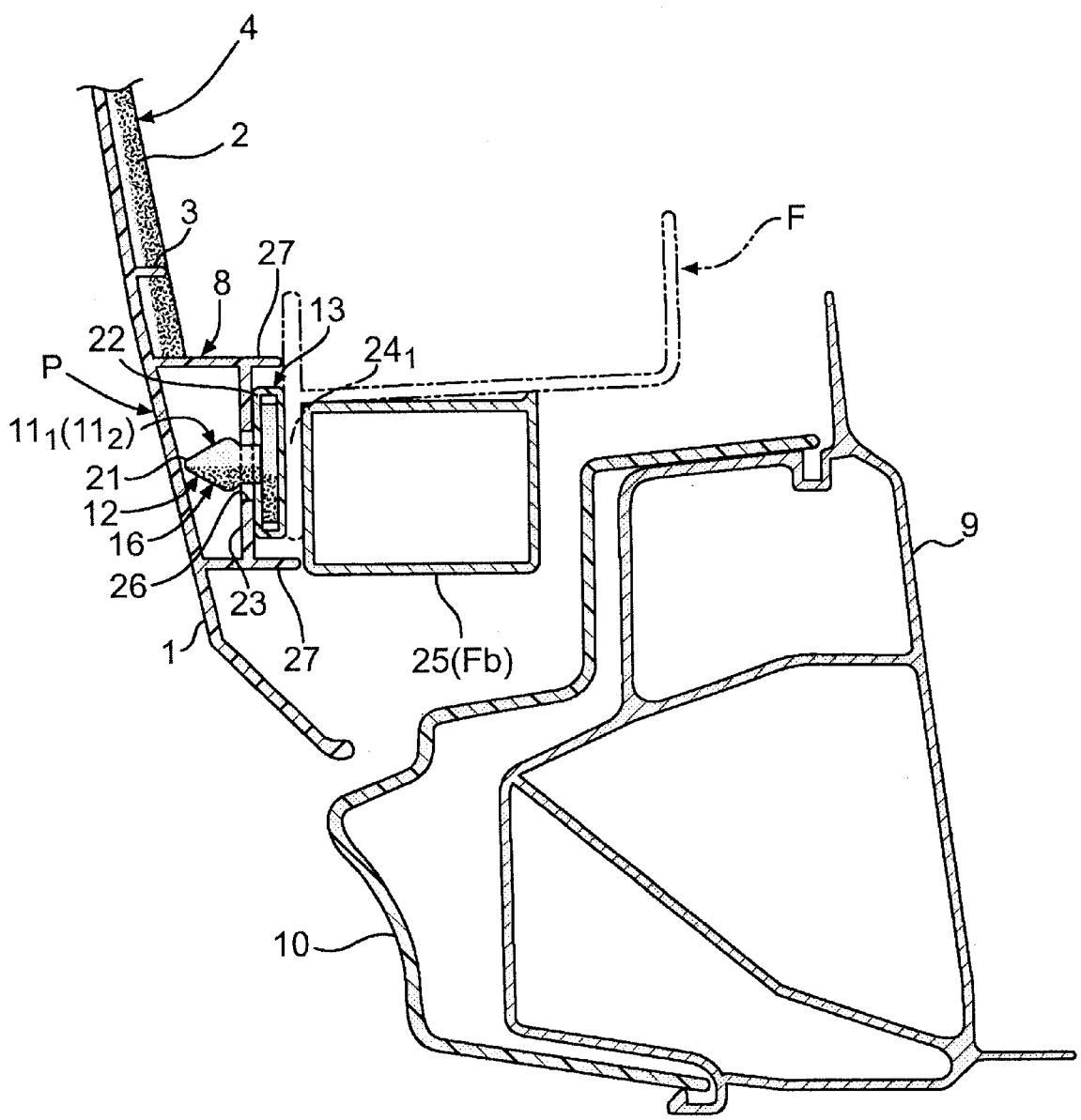
FIG. 5A shows a cross-sectional view of another preferred embodiment of the present invention.
Figure 6:
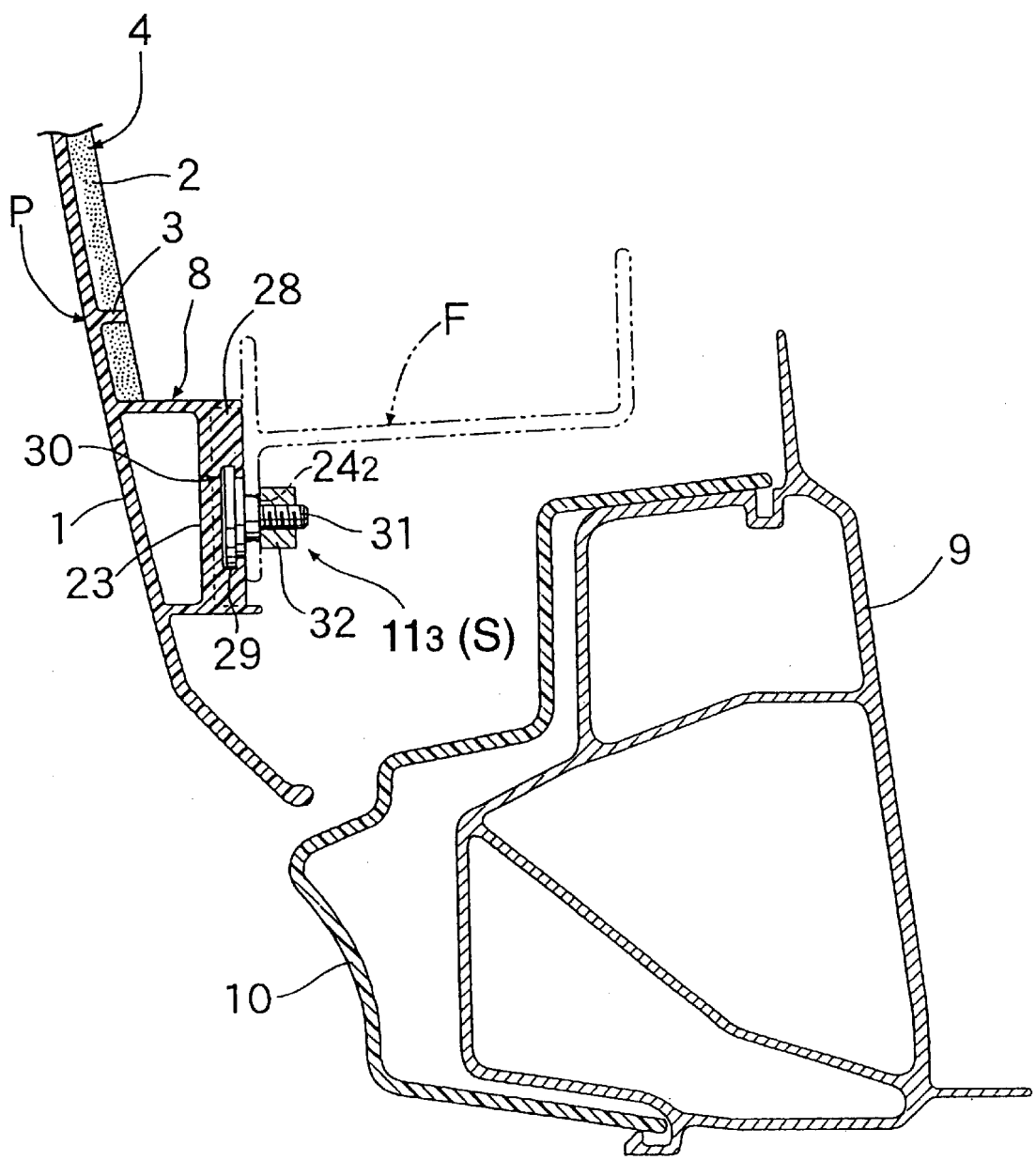
FIG. 6 shows a cross-sectional view taken along the line 6—6 of FIG. 1.

As shown in FIGS. 5 and 6, an elongated hollow reinforcement projection 8 is provided at a lower portion on the inner surface of the panel main body 1. The elongated hollow projection 8 is molded as part of a molding process of the panel main body 1 using a gas assist injection molding means and extends in a longitudinal direction of the vehicle body so as to be opposed to a side sill 9 of a vehicle body frame of an aluminum alloy. In FIGS. 5 and 6, reference numeral 10 denotes a side sill garnish, which is made of polypropylene.

Disposed in the vicinity of, and on the elongated hollow projection 8, respectively, are one bolt-nut fixed mounting position or portion (S) and at least one (but two in an illustrated example) structure (o) for provisionally fixing a panel in an easy and simplified fashion, and which are arranged one after another in the longitudinal direction of the vehicle body.

The elongated hollow projection 8 has first, second and third mounting positions or portions, $11_1$, $11_2$ and $11_3$, respectively, arranged in the longitudinal direction of the vehicle body.

Figure 7:
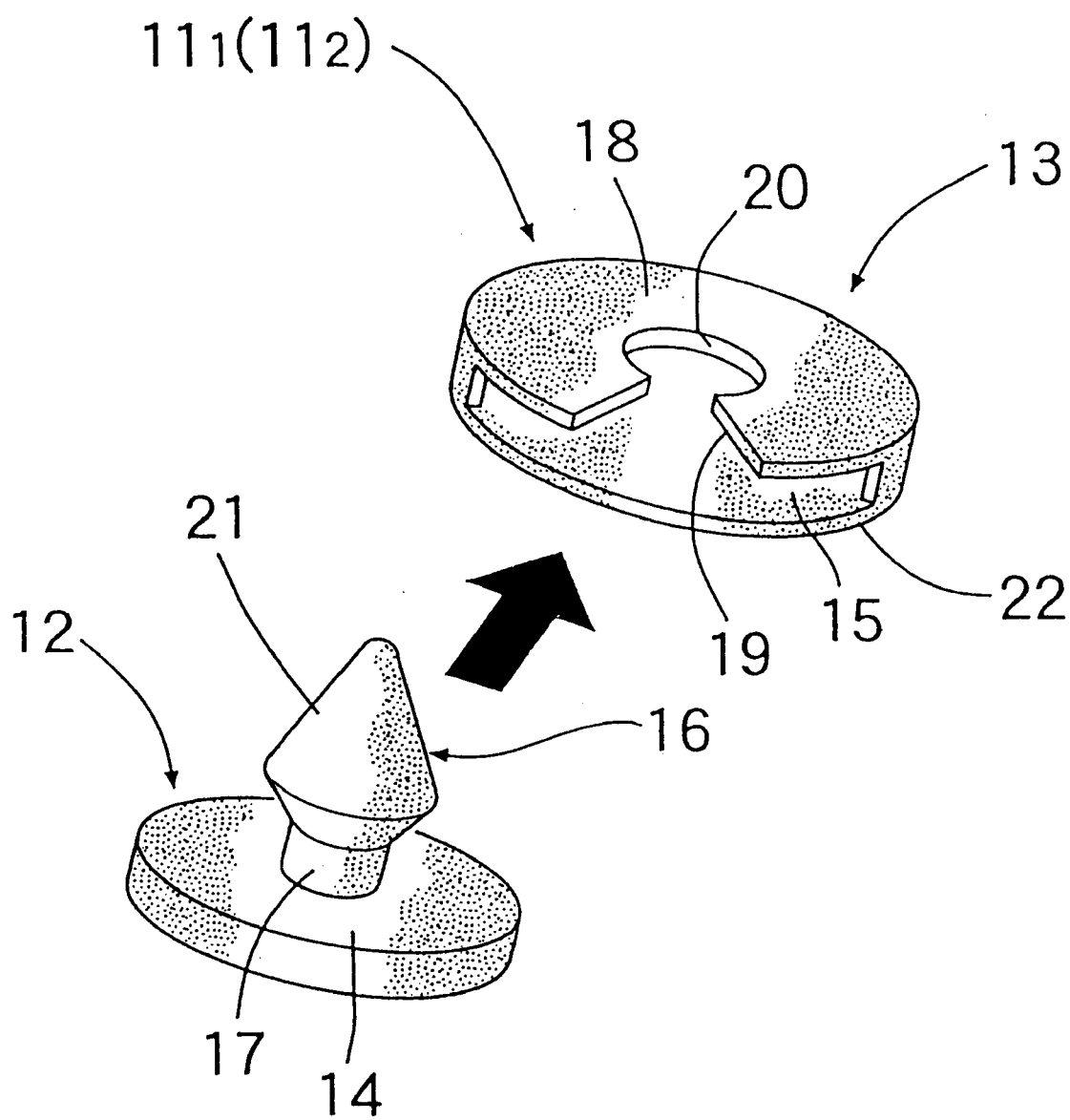
FIG. 7 shows an exploded perspective view of a locking body and a case which together form first and second mounting portions.

The first and second mounting portions $11_1$, $11_2$ (functioning as the two structures (f) for provisionally fixing a panel in an easy and simplified fashion) provided at a rear end side and an intermediate portion of the panel main body have the same construction. As shown in FIG. 7, the panel fixing structures each has a press insertion type fixing piece. The first and second Ah t mounting portions $11_1$, $11_2$ each include synthetic resin locking body 12 and a circular synthetic resin case 13 for holding the locking body. A disc portion 14 of the locking body 12 is loosely fitted in the case 13 from an opening 15 formed in a circumferential surface of the case 13. A shank portion 17 of a locking shaft 16, provided at a center of the disc portion 14 so as to protrude therefrom, is fittingly secured in an arched hole 20 by deforming a tapered insertion port 19 formed in one end plate 18 of the case 13. A part of the shank portion 17 and a conical locking portion 21 integral with the shank portion of the locking shaft 16, protrude from the end plate 18 of the case 13.

As shown in FIG. 5, the other end plate 22 of the case 13 is bonded to an outer surface of a vertical side wall 23 of the elongated hollow projection 8. When it is pressed in an engagement hole $24_1$ in the door frame F, the conical locking portion 21 forcibly penetrates through the engagement hole $24_1$, and its proximal end is brought into engagement with an opening edge of the engagement hole $24_1$. In this case, the conical locking portions 21 of the first and second mounting portions $11_1$, $11_2$ enter a square pipe-like frame constituent member 25 (Fb) of the door frame F through a through hole 26.

The frame constituent member 25 (Fb) extends from a position further to the rear than the first mounting portion $11_1$ to an intermediate portion between the second and third mounting portions $11_2$, $11_3$ and is made close to the side sill 9. In other words, the frame constituent member 25 (Fb) extends from a position more rearward than the structure (f) positioned rearmost of the two structures to an intermediate portion between the other structure (f) and the bolt-nut fixed mounting portion (S) and is made close to the side sill 9.

In addition, a pair of supporting portions 27 protrude inwardly from upper and lower edges, respectively, of the vertical side wall 23 of the elongated hollow projection 8 so as to abut against the door frame F and apply to the locking shaft 16 a force for preventing its movement in an axial direction.

As shown in FIG. 6, the third mounting portion $11_3$ on the front end side of the panel main body 1 (which functions asd a bolt-nut fixed mounting portion (S)) comprises a bolt 30, whose stepped head portion 29 is embedded in a thickened portion 28 of the vertical side wall 23 of the elongated hollow projection 8 during a molding process thereof. A threaded shank portion 31 of the bolt 30 penetrates through a mounting hole $24_2$ in the door frame F, for a nut 32 to be screwed thereon. An outer surface of the thickened portion 28 is brought into tight contact with the door frame F so as to position the door outer panel with respect to a transverse direction of the vehicle body. In addition, as shown in FIG. 1 and as will be described below, five more bolt-nut fixed mounting portions (S) of this type are provided.

With the construction described above, the positioning of the door outer panel P relative to the door frame F can be facilitated by suspending the door outer panel P relative to the door frame F and press inserting the fixing piece. Mounting of the door outer panel is carried out with the bolts 30 and the nuts 32 and good workability in mounting can be achieved. In addition, since the panel fixing structures (f) each using the fixing piece also contribute to mounting the door outer panel P onto the door frame F, the number of fixed mounting portions each using the bolt 30 and the nut 32 can be reduced, depending on the contribution by the panel fixing structures (f), making it possible to reduce man-hours required for the mounting of the door outer panel P.

On the other hand, the rigidity at the lower edge portion of the door outer panel P is enhanced by the elongated hollow reinforcement projection 8. Moreover since the elongated hollow projection 8 is opposed to the side sill 9, when a collision load is applied to the lower edge portion of the door outer panel P from the side of the vehicle body, the collision load can be efficiently absorbed by allowing the collision load to be transmitted from the door outer panel P to the entirety of the vehicle body frame via the side sill 9.

In this case, a collision load absorbing mechanism as described above can be established easily and securely by mounting the elongated hollow projection 8 to the door frame F at the portion where the frame constituent member 25 (Fb) is positioned close to the side sill 9 via the first and second mounting portions 11₁, 11₂, which are provided on the elongated hollow projection 8 and function as the panel fixing structures (f).

Figure 8:
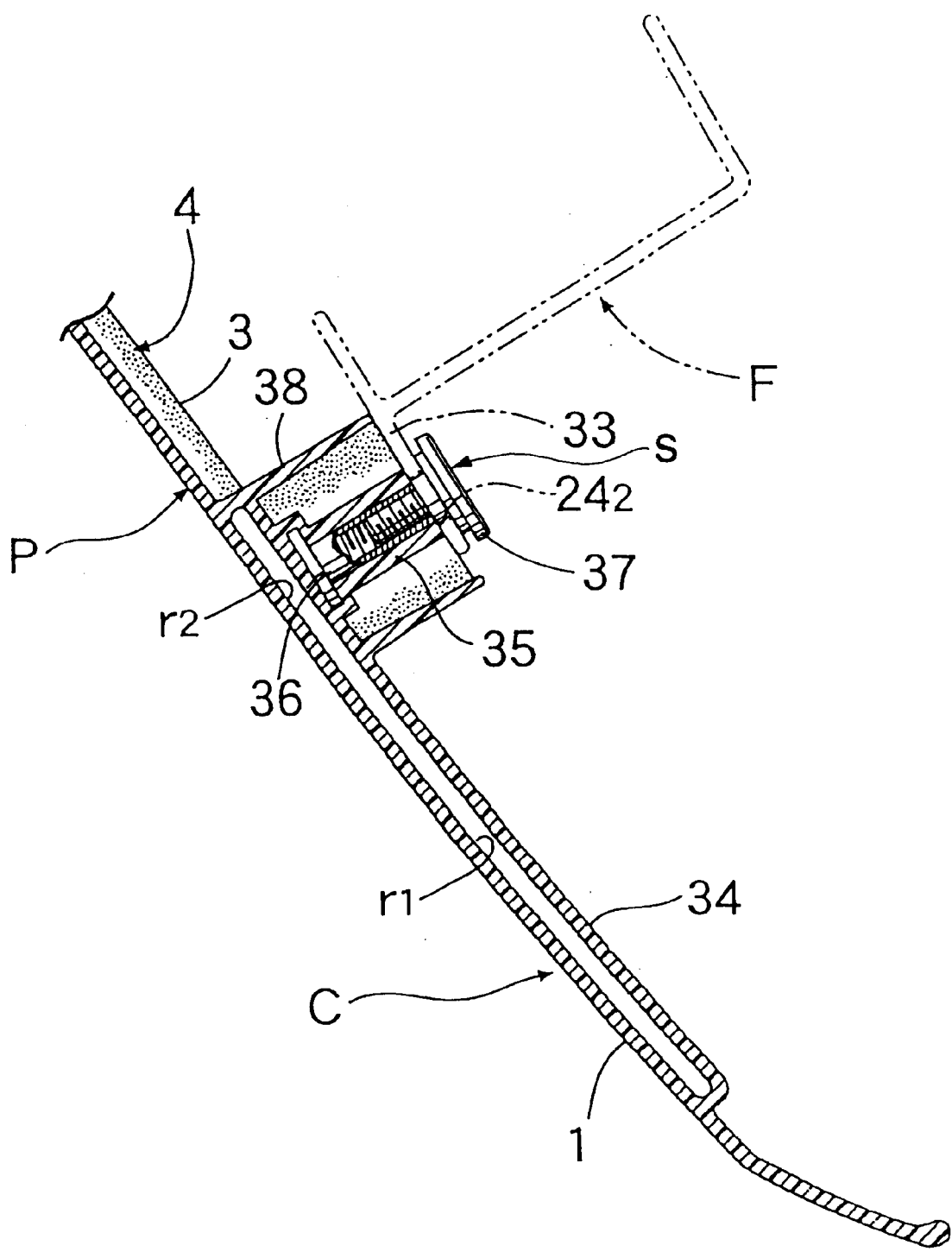
FIG. 8 shows a cross-sectional view taken along the line 8—8 of FIG. 1.

Furthermore, as shown in FIGS. 1 and 8, to reduce weight and production costs, the door frame F does not extend as far as a corner portion C at a lower portion on the rear end side of the inner surface of the panel main body 1. In order to deal with this, a continuous hollow reinforcement raised portion 34 is provided on the inner surface of the panel main body 1 at a corner area $R_1$ of the panel main body 1, and has a mounting area $r_2$ opposed to a curved portion 33 of the door frame F for mounting the door frame F thereonto. The hollow raised portion 34 extends over the two areas $r_1$, $r_2$. The hollow raised portion 34 is molded as part of a molding process of the panel main body 1 using the gas assist injection molding means. A small diameter tubular portion 35 is provided on the hollow raised portion 34 at a position opposed to the curved portion 33, and a tubular nut 36 is embedded in the small diameter tubular portion 35 during a molding process thereof. A bolt 37 penetrating through a mounting hole $24_2$ in the curved portion 33 is screwed onto the tubular nut 36. The bolt 37 and the tubular nut 36 comprise another bolt-nut fixed mounting portion (S). In this case, the small diameter tubular portion 35 and a large diameter tubular portion 38 surrounding it are brought into abutment with the curved portion 33 at one end surface thereof, to position the door outer panel P with respect to the transverse directions of the vehicle body, thus reinforcing the corner area $r_1$ and the mounting area $r_2$ so as to prevent a flutter of the corner portion C.

In addition, enhancing the surface torsional rigidity of the door outer panel P is of concern. Namely, the hollow raised portion 34 is located, as described above, at the lower portion on the rear end side of the inner surface of the panel main body 1 and communicates with the elongated hollow projection 8. A second reinforcement rib $5_2$, which is continuous with the elongated hollow projection 8 at the front end side thereof, is disposed on the inner surface of the panel main body 1 along a side edge portion on the front end side of the panel main body 1. A third reinforcement rib $5_3$, which is continuous with the hollow raised portion 34, is disposed on the inner surface of the panel main body 1 along a side edge portion on the rear end side of the panel main body 1. The second and third reinforcement ribs $5_2$, $5_3$ are molded integrally with the panel main body 1. The first reinforcement rib $5_1$ (functioning as a hook portion) disposed along the upper edge portion of the inner surface of the panel main body 1 is close to the upper ends of the second and third reinforcement ribs $5_2$, $5_3$ at the ends thereof. Thus, substantially the entirety of the panel main body 1 at sides thereof is reinforced in a manner as described above.

Figure 9:
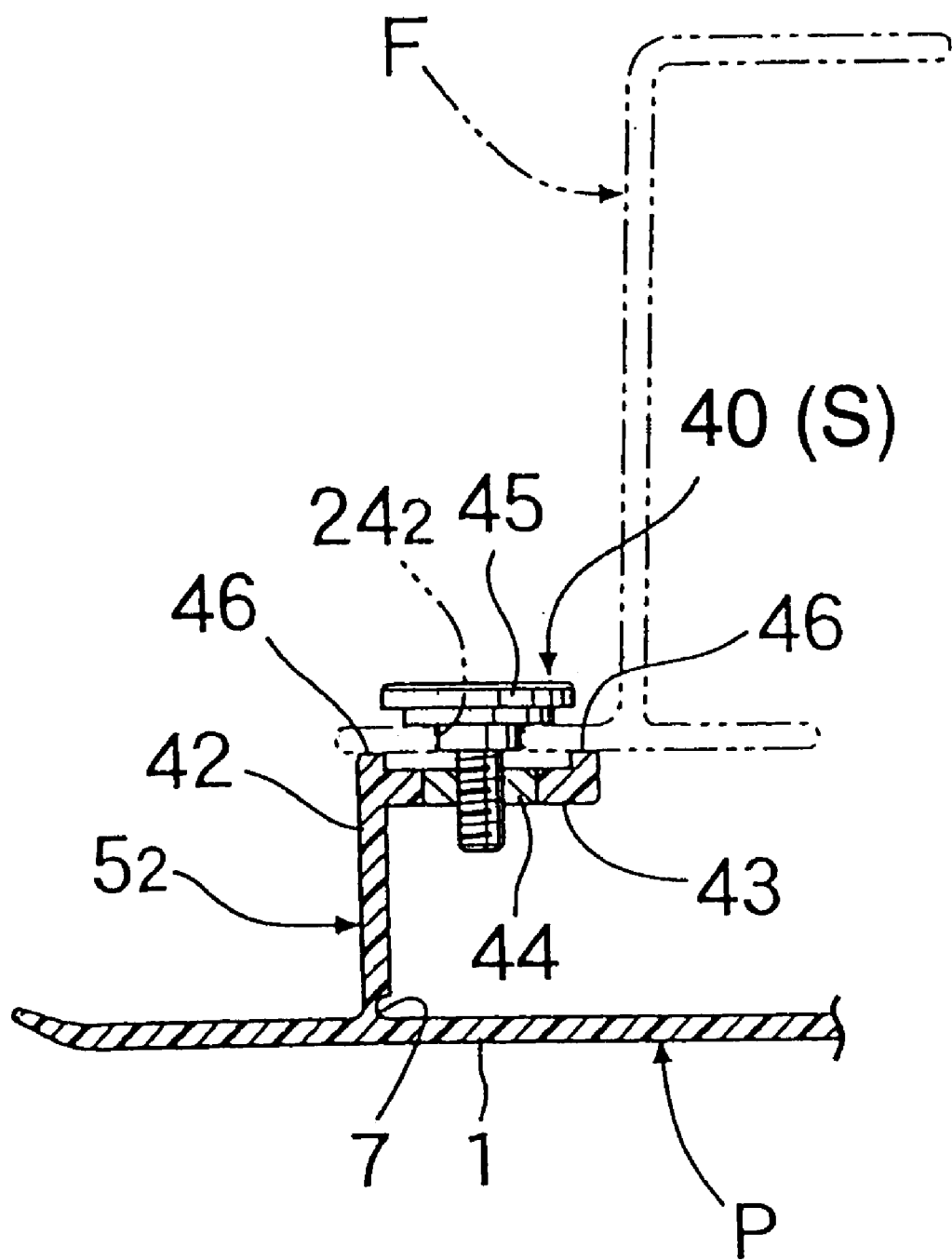
FIG. 9 shows a cross-sectional view taken along the line 9—9 of FIG. 1.

Mounting portions 40, 41 provided, respectively, at one position along the second reinforcement rib $5_2$ and two positions along the third reinforcement rib $5_3$, have the same construction and function as the bolt-nut fixed mounting portions (S). The mounting portion 40 of the second reinforcement rib $5_2$ (one of the bolt-nut fixed mounting portions (S)) will be described. As shown in FIG. 9, the second reinforcement rib $5_2$ has an L-shaped portion 42. A nut 44 is embedded in a bent portion 43 at a free end of the L-shaped portion 42 during a molding process thereof. Then, a bolt 45 penetrating through a mounting hole $24_2$ in the door frame F is screwed into the nut 44. Elongated projections 46 at edge portions of the bent portion 43 are brought into abutment with the door frame F to apply a force to the bolt 45 that prevents it from loosening. Sink mark preventing small elongated recesses 7, similar to that in the first reinforcement rib $5_1$, are provided in the second and third reinforcement ribs $5_2$, $5_3$ as well.

As shown in FIGS. 1 and 4, a projecting piece 47 is provided on the upper edge of the panel main body 1 at the front end side thereof and a nut 48 is embedded in the projecting piece 47 during a molding process. A bolt 49, which penetrates through a mounting hole $24_2$ in the door frame F, is screwed into the nut 48. The bolt 49 and nut 48 comprise another bolt-nut fixed mounting portion (S). Elongated projections 50 of the projecting piece 47 are brought into abutment with the door frame F, to apply a force to the bolt 49 that prevents it from loosening.

The synthetic resin vehicle door outer panel constructed as described above causes a collision load applied from the side of the vehicle body to be absorbed by the vehicle body frame by allowing the collision load to be transmitted to the vehicle body frame. The collision load can be transmitted to the vehicle body frame in a more secure fashion.

The synthetic resin vehicle door outer panel constructed as described above prevents the flutter of the corner portion not supported by the door frame by reinforcing the corner area and the mounting area, and provides a high surface torsional rigidity.

The door outer panel mounting structure constructed as described above facilitates the positioning of a synthetic resin door outer panel relative to a door frame and reduces man-hours required for the mounting of the door outer panel, thereby making it possible to reduce the production cost for the mounting structure.

It is possible to provide a uniform reinforcement by the frame constituent member relative to the vertically intermediate portion of the door outer panel with respect to the longitudinal direction of the vehicle body by only allowing the door outer panel to be positioned and held relative to the door frame, thereby reducing the production cost.

While the invention has been described in connection with the preferred embodiments of the invention, it will be obvious to those skilled in the art that various changes and modifications may be made therein without departing from the invention, and it is aimed, therefore, to cover in the appended claim all such changes and modifications as fall within the true spirit and scope of the invention.

What is claimed is:

1. A synthetic resin vehicle door outer panel comprising:
   a panel main body; and
   an elongated hollow reinforcement projection on an inner surface of the panel main body and extending in a longitudinal direction of a vehicle body so as to be opposed to a side sill of a vehicle body frame;
   wherein the panel main body is adjacent to a frame constituent member extending straight in the longitudinal direction of the vehicle body, and the panel main body comprises a grid-like reinforcement portion having a plurality of notches arranged in the longitudinal direction of the vehicle body, and
   wherein a gap exists between a side of the frame constituent member and surfaces of the plurality of notches, the gap being uniform between the frame constituent member and each of the plurality of notches.

2. The synthetic resin vehicle door outer panel as set forth in claim 1, wherein the elongated hollow reinforcement projection has mounting portions for mounting onto portions of a door frame that are close to the side sill.

3. The synthetic resin vehicle door outer panel as set forth in claim 2, further including a continuous hollow reinforcement raised portion on the inner surface of the panel main body, wherein the raised portion has a mounting area, for mounting the door frame thereonto, and extends from the mounting area to a corner area of the panel main body.

4. The synthetic resin vehicle door outer panel as set forth in claim 3, wherein the hollow raised portion is on the inner surface of the panel main body at a lower portion on a rear end side of the panel main body and communicates with the elongated hollow projection, wherein a second reinforcement rib is continuous with the elongated hollow projection and is disposed on the inner surface of the panel main body along a side edge portion of a front end side of the panel main body, wherein a third reinforcement rib is continuous with said hollow raised portion and is disposed on the inner surface of the panel main body along a side edge portion on the rear end side of the panel main body, and wherein a first reinforcement rib is close to upper ends of the second and third reinforcement ribs at ends thereof and is disposed on the inner surface of the panel main body along an upper edge portion thereof.

5. A synthetic resin vehicle door outer panel comprising:

a panel main body;

an elongated hollow reinforcement projection on an inner surface of the panel main body and extending in a longitudinal direction of a vehicle body so as to be opposed to a side sill of a vehicle body frame; and a continuous hollow reinforcement raised portion on the inner surface of the panel main body, wherein the raised portion has a mounting area, for mounting a door frame thereonto, and extends from the mounting area to a corner area of the panel main body.

6. The synthetic resin vehicle door outer panel as set forth in claim 3, wherein the hollow raised portion is on the inner surface of the panel main body at a lower portion on a rear end side of the panel main body and communicates with the elongated hollow projection, wherein a second reinforcement rib is continuous with the elongated hollow projection and is disposed on the inner surface of the panel main body along a side edge portion of a front end side of the panel main body, wherein a third reinforcement rib is continuous with the hollow raised portion and is disposed on the inner surface of the panel main body along a side edge portion on the rear end side of the panel main body, and wherein a first reinforcement rib is close to upper ends of the second and third reinforcement ribs at ends thereof and is disposed on the inner surface of the panel main body along an upper edge portion thereof.

7. A vehicle door outer panel mounting structure comprising:

a door frame;

a synthetic resin door outer panel;

a mounting member for mounting the door outer panel on the door frame, the mounting member having a bolt and a nut mating with the bolt;

a suspension structure for suspending the door outer panel; and a fixing member for affixing the door outer panel on the door frame before mounting the door outer panel on the door frame with the mounting member, wherein the suspension structure comprises a hook portion formed integrally with an upper portion on an inner surface of the door outer panel, and an engagement portion on the door frame for engagement with the hook portion, wherein the fixing member comprises a press-insertion-type affixing piece on at least one of the door outer panel and the door frame, and an engagement hole for receiving the press-insertion-type affixing piece on the other of the door outer panel and the door frame, wherein the door outer panel is adjacent to a frame constituent member extending straight in a longitudinal direction of a vehicle body, and the door outer panel comprises a grid-like reinforcement portion having a plurality of notches arranged in the longitudinal direction of the vehicle body, and wherein a gap exists between a side of the frame constituent member and inner surfaces of the plurality of notches, the gap being uniform between the frame constituent member and each of the plurality of notches.

8. A vehicle door comprising:

a synthetic resin door outer panel; and a door frame on an inner surface side of the door outer panel for holding the door outer panel, the door frame having a frame constituent member extending straight in a longitudinal direction of a vehicle body for reinforcing the door outer panel, wherein the door outer panel has a grid-like integrally formed reinforcement portion on the inner surface side, wherein the grid-like reinforcement portion has a plurality of notches arranged in the longitudinal direction of the vehicle body, and wherein a gap exists between a side of the frame constituent member and inner surfaces of the plurality of notches, the gap being uniform between the frame constituent member and each of the plurality of notches.

* * * * *